(12) United States Patent
Chang (10) Patent No.: US 7,580,206 B2
(45) Date of Patent: Aug. 25, 2009

(54) FIXED FOCAL LENGTH LENS SYSTEM

(75) Inventor: Ku-Yuan Chang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 30 days.

(21) Appl. No.: 11/869,773

(22) Filed: Oct. 10, 2007

(65) Prior Publication Data

US 2008/0218877 A1   Sep. 11, 2008

(51) Int. Cl.
*G02B 9/04*   (2006.01)
*G02B 3/02*   (2006.01)
*G02B 9/62*   (2006.01)

(52) U.S. Cl. .................. 359/793; 359/717; 359/756; 359/757

(58) Field of Classification Search .............. 359/754, 359/755, 756, 757, 793, 708, 713, 658, 717
See application file for complete search history.

(56) References Cited

U.S. PATENT DOCUMENTS 6,995,925 B2 *   2/2006   Noda .................. 359/691

\* cited by examiner

*Primary Examiner*—William C Choi
*Assistant Examiner*—Jack Dinh
(74) *Attorney, Agent, or Firm*—Thomas, Kayden, Horstemeyer & Risley (57) ABSTRACT

A fixed focal length lens system comprises a first lens unit and a second lens unit. The first lens unit comprises a plastic negative lens, wherein the first lens unit has a negative diopter, and the plastic negative lens comprises at least one non-spherical surface. The second lens unit comprises a plastic positive lens, wherein the second lens unit has a positive diopter. The fixed focal length lens system satisfies the equation: $-1 < 2Gf/1Gf < 0$, wherein 1Gf is the focal length of the first lens unit and 2Gf is the focal length of the second lens unit.

6 Claims, 13 Drawing Sheets

IMA=0.00nm

FIG. 3A

IMA=1.41nm

FIG. 3B

IMA=2.35nm

IMA=0.00nm

FIG. 8A

IMA=1.11nm

FIG. 8B

IMA=1.85nm

FIG. 8C

IMA=2.59nm

FIG. 8D

IMA=3.33nm

FIG. 8E

IMA=3.70nm

FIXED FOCAL LENGTH LENS SYSTEM

BACKGROUND OF THE INVENTION

1. Field of the Invention

The invention relates to a lens system, and more particularly to a fixed focal length lens system.

2. Description of the Related Art

Recently, the popularity of smaller and lighter digital cameras has increased dramatically. As a result, design for smaller and lighter optical lens systems for digital cameras has also grown. Lens systems can be classified into fixed focal length lens systems and zoom lens systems. Fixed focal length lens systems provide improved image quality with a relatively simpler structure and lower cost.

Although fixed focal length lens systems are well developed, cost, length and image quality thereof still require further improvement.

Therefore, a goal for digital camera designers is to provide a digital camera with improved image quality, lower cost and a shorter focal length lens.

BRIEF SUMMARY OF THE INVENTION

A detailed description is given in the following embodiments with reference to the accompanying drawings.

The invention provides a fixed focal length lens system to reduce cost and improve image quality.

The invention provides a fixed focal length lens system comprising a first lens unit and a second lens unit. The first lens unit comprises a plastic negative lens, wherein the first lens unit has a negative diopter, and the plastic negative lens comprises at least one non-spherical surface. The second lens unit comprises a plastic positive lens, wherein the second lens unit has a positive diopter, and the plastic positive lens comprises at least one non-spherical surface. The first lens unit and the second lens unit are aligned from an object side to an image side on an optical axis. The fixed focal length lens system satisfies the equation: $-1<2Gf/1Gf<0$, wherein $1Gf$ is a focal length of the first lens unit, and $2Gf$ is a focal length of the second lens unit.

The first lens unit further comprises an end positive lens located on the image side of the plastic negative lens. The first lens unit satisfies the equation: $-0.5<(C1f/L3f)<0.5$, wherein $C1f$ is a focal length of the plastic negative lens without a focal length of the end positive lens, and $L3f$ is a focal length of the end positive lens.

The first lens unit further comprises an object positive lens and an end positive lens located on two sides of the plastic negative lens. The first lens unit satisfies the equation: $-0.5<(C1f/L3f)<0.5$, wherein $C1f$ is a focal length of the plastic negative lens without a focal length of the end positive lens, which is a combination of a focal length of the object positive lens and the plastic negative lens, and $L3f$ is a focal length of the end positive lens.

The second lens unit comprises a central positive lens and an image negative lens, wherein the central positive lens is located between the plastic positive lens and the image negative lens. The second lens unit satisfies the equation: $-1.5<(L5f/L6f)<-0.5$, wherein $L5f$ is a focal length of the central positive lens, and $L6f$ is a focal length of the image negative lens.

The fixed focal length lens system further comprises an aperture raster located between the first lens unit and the second lens unit. The fixed focal length lens system further comprises a filter located between the second lens unit and the image end.

The invention provides another fixed focal length lens system comprising a first lens unit and a second lens unit aligned from an object side to an image side on an optical axis. The first lens unit has a negative diopter, and the second lens unit has a positive diopter. The first lens unit comprises a second negative lens and a third positive lens aligned from the object side to the image side. The second lens unit comprises a fourth positive lens, a fifth positive lens and the sixth negative lens aligned from the object side to the image side. The fixed focal length lens system satisfies the equation: $-1<2Gf/1Gf<0$, wherein $1Gf$ is a focal length of the first lens unit, and $2Gf$ is a focal length of the second lens unit.

The invention provides another fixed focal length lens system comprising a first lens unit and a second lens unit aligned from an object side to an image side on an optical axis. The first lens unit has a negative diopter, and the second lens unit has a positive diopter. The first lens unit comprises a first positive lens, a second negative lens and a third positive lens aligned from the object side to the image side. The second lens unit comprises a fourth positive lens, a fifth positive lens and the sixth negative lens aligned from the object side to the image side. The fixed focal length lens system satisfies the equation: $-1<2Gf/1Gf<0$, wherein $1Gf$ is a focal length of the first lens unit, and $2Gf$ is a focal length of the second lens unit.

The second negative lens is a plastic negative lens comprising at least one non-spherical surface. The fourth positive lens is a plastic positive lens comprising at least one non-spherical surface. The first lens unit satisfies the equation: $-0.5<(C1f/L3f)<0.5$, wherein $C1f$ is a focal length of the plastic negative lens without a focal length of the end positive lens, and $L3f$ is a focal length of the end positive lens. The second lens unit satisfies the equation: $-1.5<(L5f/L6f)<-0.5$, wherein $L5f$ is a focal length of the central positive lens, and $L6f$ is a focal length of the image negative lens.

The fixed focal length lens system further comprises an aperture raster located between the first lens unit and the second lens unit. The fixed focal length lens system further comprises a filter located between the second lens unit and the image end.

The invention shares tolerance sensitivity between lenses, and utilizes plastic non-spherical lenses to decrease cost and improve image quality. Additionally, the invention decreases length of the fixed focal length lens system.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention shares tolerance sensitivity between lenses, and utilizes plastic non-spherical lenses to decrease cost. The optical parameter and lens material of the invention can be modified.

The invention provides a fixed focal length lens system comprising a first lens unit and a second lens unit aligned from an object side to an image side on an optical axis. When the fixed focal length lens system is disposed in a camera, an optical sensing element is located on the image side. The first lens unit comprises a plastic negative lens, wherein the first lens unit has a negative diopter, and the plastic negative lens comprises at least one non-spherical surface. The second lens unit comprises a plastic positive lens, wherein the second lens unit has a positive diopter, the plastic positive lens comprises at least one non-spherical surface.

The fixed focal length lens system of the invention satisfies the equation:

$$-1 < 2Gf/1Gf < 0 \qquad (1), \text{wherein}$$

1Gf is a focal length of the first lens unit, and 2Gf is a focal length of the second lens unit.

The first lens unit further comprises an end positive lens located on the image side of the plastic negative lens. The first lens unit satisfies the equation:

$$-0.5 < (C1f/L3f) < 0.5 \qquad (2), \text{wherein}$$

C1f is a focal length of the plastic negative lens without a focal length of the end positive lens, and L3f is a focal length of the end positive lens.

Additionally, in a modified embodiment, the first lens unit further comprises an object positive lens disposed on the object side of the plastic negative lens. The first lens unit satisfies formula (2), wherein C1f is a combination of a focal length of the object positive lens and the plastic negative lens, and L3f is a focal length of the end positive lens.

The second lens unit comprises a central positive lens and an image negative lens, and the central positive lens is located between the plastic positive lens and the image negative lens. The second lens unit satisfies the equation:

$$-1.5 < (L5f/L6f) < -0.5 \qquad (3), \text{wherein}$$

L5f is a focal length of the central positive lens, and L6f is a focal length of the image negative lens.

Figure 1:
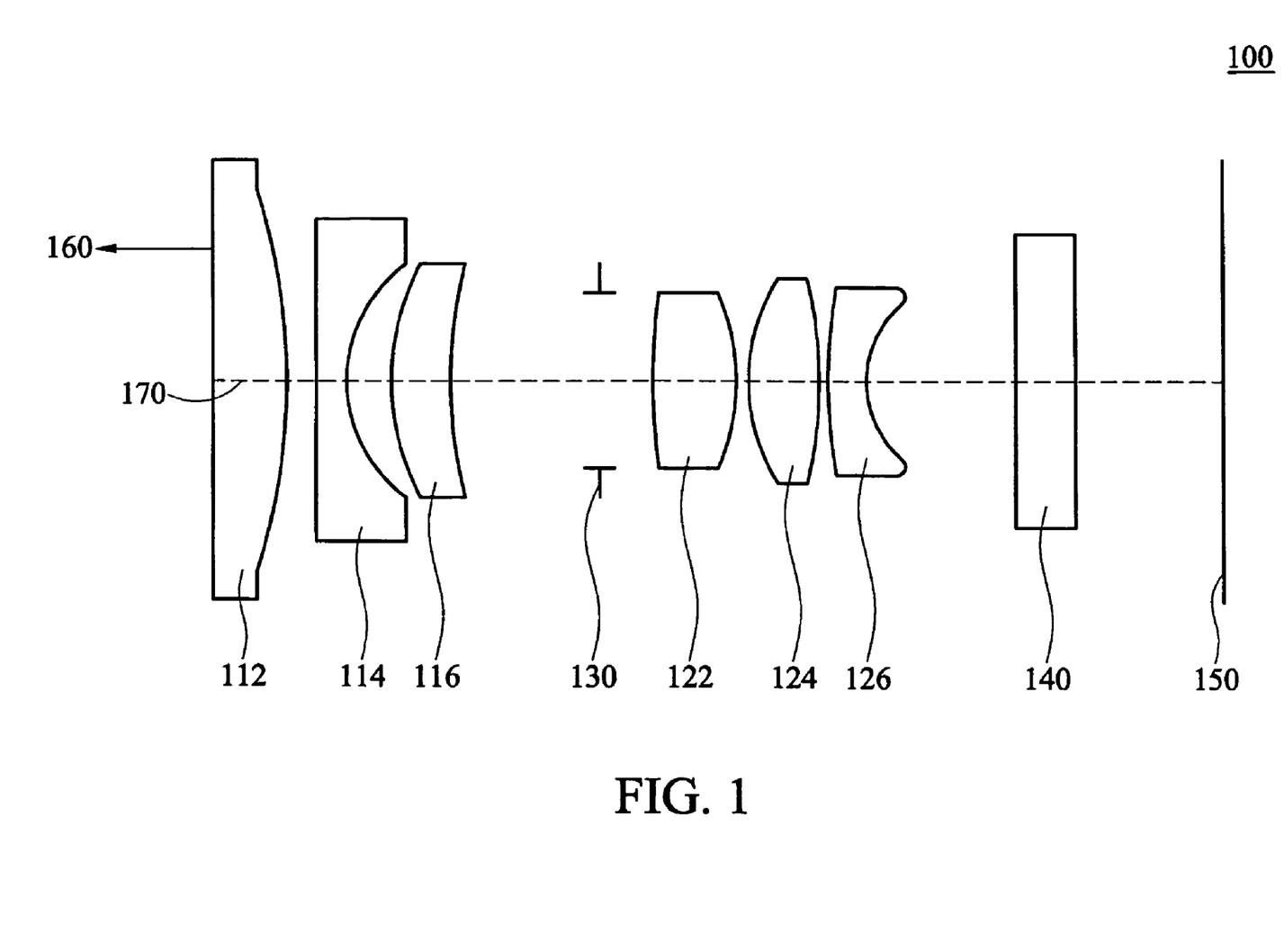
FIG. 1 shows a fixed focal length lens system of the first embodiment of the invention.

The detailed structure of the fixed focal length lens system is disclosed in the following description. FIG. 1 shows a fixed focal length lens system 100 of the first embodiment of the invention. The fixed focal length lens system 100 comprises a first lens unit 110 and a second lens unit 120 aligned from an object side 160 to an image side 150 on an optical axis 170. The first lens unit 110 has a negative diopter, and the second lens unit 120 has a positive diopter. Each of the first lens unit 110 and the second lens unit 120 comprises three lenses. The lenses are named following an order from the object side 160 to the image side 150 to define the positions thereof.

The first lens unit 110 comprises a first positive lens 112, a second negative lens 114 and a third positive lens 116 aligned from the object side 160 to the image side 150. The first positive lens 112 is the object positive lens, the second negative lens 114 is the plastic negative lens, and the third positive lens 116 is the end positive lens.

The second lens unit 120 comprises a fourth positive lens 122, a fifth positive lens 124 and the sixth negative lens 126 aligned from the object side 160 to the image side 150. The fourth positive lens 122 is the plastic positive lens, the fifth positive lens 124 is the central positive lens, and the sixth negative lens 126 is the image negative lens.

The first lens unit 110 and the second lens unit 120 satisfy formula (1) to share tolerance sensitivity therebetween. The first lens unit 110 reduces chromatism by positive-negative-positive lens alignment, wherein the second negative lens 114 is a non-spherical lens to reduce aberration. Focal lengths of the lenses 112, 114 and 116 of the first lens unit 110 satisfy formula (2). The fifth plus lens 124 corresponds to the sixth negative lens 126 to reduce aberration. Focal lengths of the fifth plus lens 124 and the sixth negative lens 126 satisfy formula (3).

The fixed focal length lens system 100 further comprises an aperture raster 130 located between the first lens unit 110 and the second lens unit 120. The fixed focal length lens system 100 further comprises a filter 140 located between the second lens unit 120 and the image end.

To show the advantages of the fixed focal length lens system 100, an embodiment is disclosed with optical parameters and optical character charts thereof.

Figure 6:
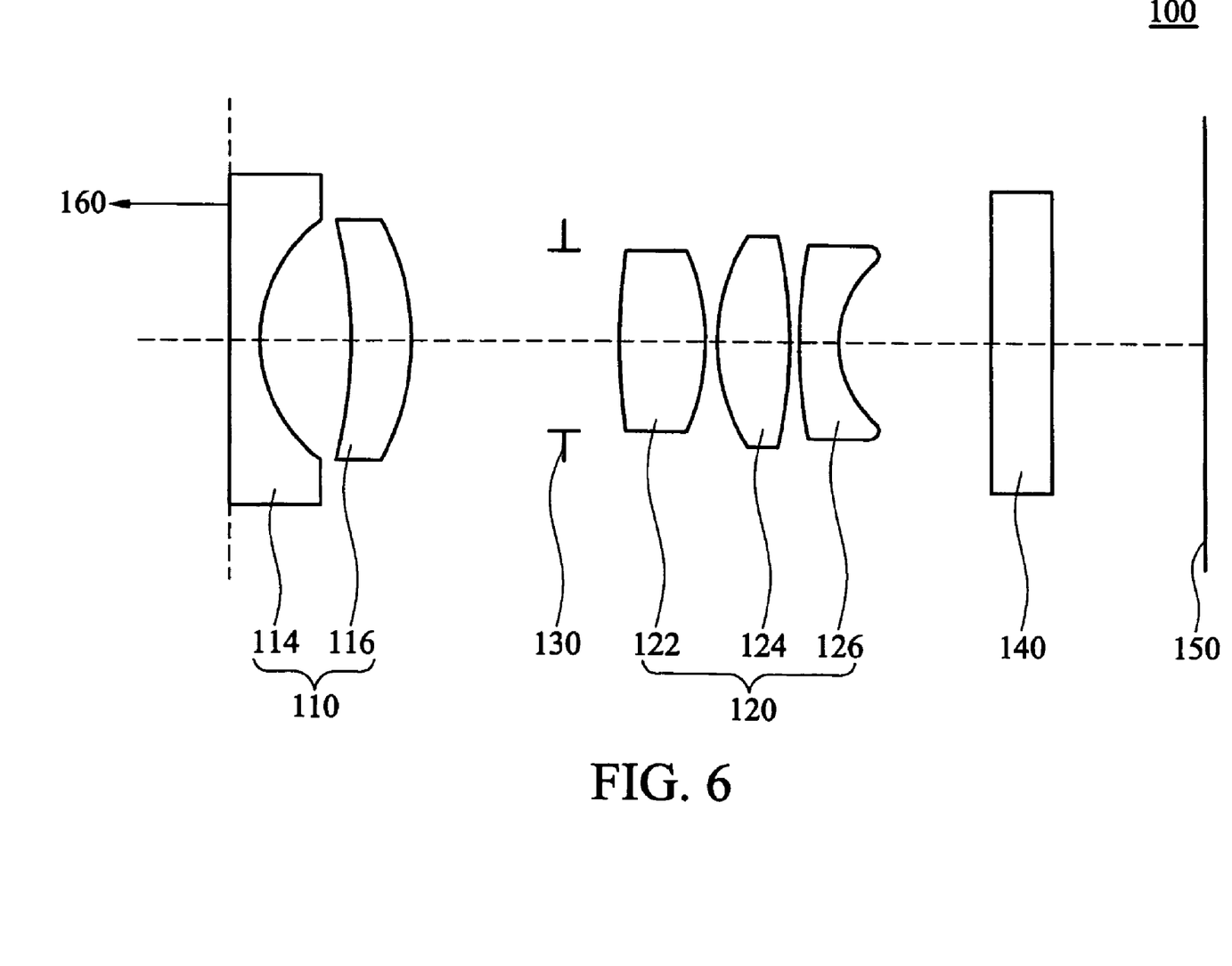
FIG. 6 shows a fixed focal length lens system of the second embodiment of the invention.

With reference to FIG. 6, a second embodiment of the fixed focal length lens system 100 is provides to describe relationships between the lenses of the invention. The fixed focal length lens system 100 comprises a first lens unit 110 and a second lens unit 120 aligned from an object side 160 to an image side 150 on an optical axis 170. The first lens unit 110 has a negative diopter, and the second lens unit 120 has a positive diopter. The first lens unit 110 comprises two lenses, and the second lens unit 120 comprises three lenses. The lenses are named following an order from the object side 160 to the image side 150 to define the positions thereof.

The first lens unit 110 comprises a second negative lens 114 and a third positive lens 116 aligned from the object side 160 to the image side 150. The second negative lens 114 is the plastic negative lens, and the third positive lens 116 is the end positive lens.

The second lens unit 120 comprises a fourth positive lens 122, a fifth positive lens 124 and the sixth negative lens 126 aligned from the object side 160 to the image side 150. The fourth positive lens 122 is the plastic positive lens, the fifth positive lens 124 is the central positive lens, and the sixth negative lens 126 is the image negative lens.

The first lens unit 110 and the second lens unit 120 satisfy formula (1) to share tolerance sensitivity therebetween. The first lens unit 110 reduces chromatism by a positive-negative-positive lens alignment, wherein the second negative lens 114 is a non-spherical lens to reduce aberration. Focal lengths of the lenses 114 and 116 of the first lens unit 110 satisfy formula (2). The fifth positive lens 124 corresponds to the sixth negative lens 126 to reduce aberration. Focal lengths of the fifth positive lens 124 and the sixth negative lens 126 satisfy formula (3).

The fixed focal length lens system 100 further comprises an aperture raster 130 located between the first lens unit 110 and the second lens unit 120. The fixed focal length lens system 100 further comprises a filter 140 located between the second lens unit 120 and the image end.

To show the advantage of the fixed focal length lens system 100, the above two embodiments are disclosed in the following description with optical parameters and optical character charts thereof.

Table 1 shows parameters of the first lens unit and the second lens unit of the fixed focal length lens system of the first embodiment, wherein S11 and S12 are object surface and image surface of the first positive lens, S21 and S22 are object surface and image surface of the second negative lens, S31 and S32 are object surface and image surface of the third positive lens, S41 and S42 are object surface and image surface of the fourth positive lens, S51 and S52 are object surface and image surface of the fifth positive lens, S61 and S62 are object surface and image surface of the sixth negative lens, STO is aperture raster 130, and FS1 and FS2 are two surfaces of the filter 140.

TABLE 1

| Assign number | Curvature radius (mm) | Thickness (mm) | Refractive index (Nd) | Abbe number (Vd) | Conic coefficient |
|---|---|---|---|---|---|
| S11 | −172.22 | 1.5 | 1.497 | 81.6 | |
| S12 | −19.42 | 0.2 | | | |
| S21 | 45.58 | 0.8 | 1.514648 | 56.963513 | −37.36002 |
| S22 | 3.86 | 1 | | | −0.110222 |
| S31 | 5.76 | 1.2 | 1.51742 | 52.1 | |
| S32 | 6.38 | 3.2 | | | |
| STO. | INF. | 0.8 | | | |
| S41 | 17.6 | 1.8 | 1.514648 | 56.963513 | −5.175289 |
| S42 | −6.02 | 0.2 | | | −12.14287 |
| S51 | 5.72 | 1.6 | 1.6968 | 55.5 | |
| S52 | −15.8 | 0.2 | | | |
| S61 | 15.26 | 0.8 | 1.84666 | 23.8 | |
| S62 | 3.53 | 3 | | | |
| FS1 | INF. | 1 | 1.5168 | 64.2 | |
| FS2 | INF. | 3.486 | | | |

Other optical characteristics of the fixed focal length lens system of the first embodiment are shown on Table 2.

TABLE 2

| Item | Number |
|---|---|
| 2Gf/1Gf | −0.529 |
| (C1f)/L3f | 0.104 |
| L5f/L6f | −1.11 |
| System length | 20.786 mm |
| F number | 2.949 |
| Focal length | 7.193 mm |
| Highest image height | 4.6 mm |

With reference to Table 2, the ratio 2Gf/1Gf of the fixed focal length lens system of the first embodiment is −0.529, satisfying formula (1). The ratio (C1f)/L3f is 0.104, satisfying formula (2). The ratio L5f/L6f is −1.11, satisfying formula (3).

The second negative lens of the first lens unit and the fourth positive lens of the second lens unit are non-spherical lens, which satisfy the following formula:

$$z = \frac{ch^2}{1 + [1 - (k+1)c^2h^2]^{1/2}} + Ah^4 + Bh^6 + Ch^8 + Dh^{10},$$

wherein z is the sag number of the lens which represents depression of the lens surface, c is the inverse of the curvature radius, h is the distance between the lens surface and the optical axis, and k is Conic coefficient. A, B, C and D are high order non-spherical coefficients. The high order non-spherical coefficients of the non-spherical surfaces are shown in Table 3.

TABLE 3

| Surface number | A | B | C | D |
|---|---|---|---|---|
| S21 | −2.09289 × 10$^{-4}$ | 1.91545 × 10$^{-6}$ | −4.37625 × 10$^{-7}$ | −4.93489 × 10$^{-9}$ |
| S22 | 1.22913 × 10$^{-3}$ | 1.41628 × 10$^{-4}$ | −5.35465 × 10$^{-6}$ | 1.54571 × 10$^{-6}$ |
| S41 | 2.12583 × 10$^{-4}$ | 1.79118 × 10$^{-4}$ | 1.22617 × 10$^{-5}$ | 1.97502 × 10$^{-6}$ |
| S42 | −5.18960 × 10$^{-3}$ | 9.91695 × 10$^{-4}$ | −9.02320 × 10$^{-5}$ | 8.23986 × 10$^{-6}$ |

Figure 2A:
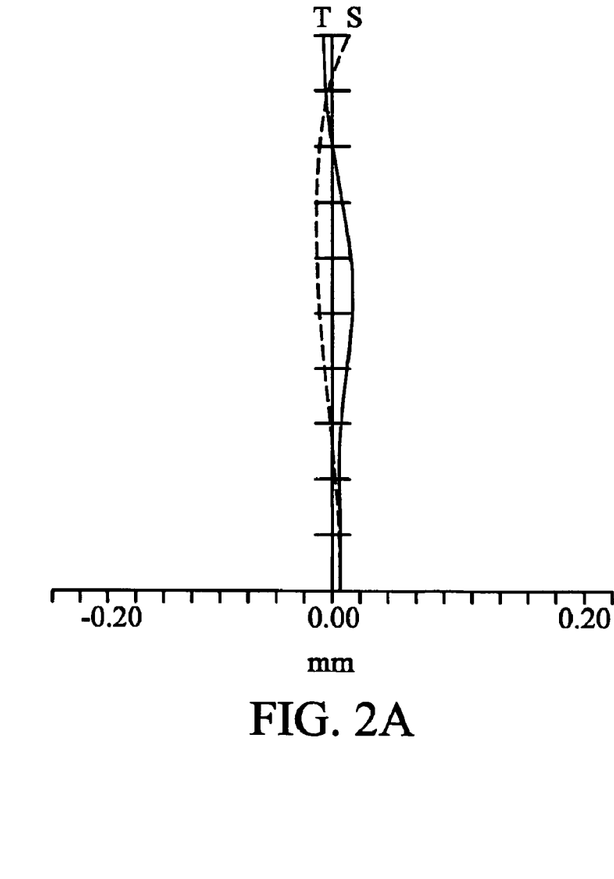
FIG. 2A is Field Curvature diagram of the fixed focal length lens system of the first embodiment of the invention.
Figure 2B:
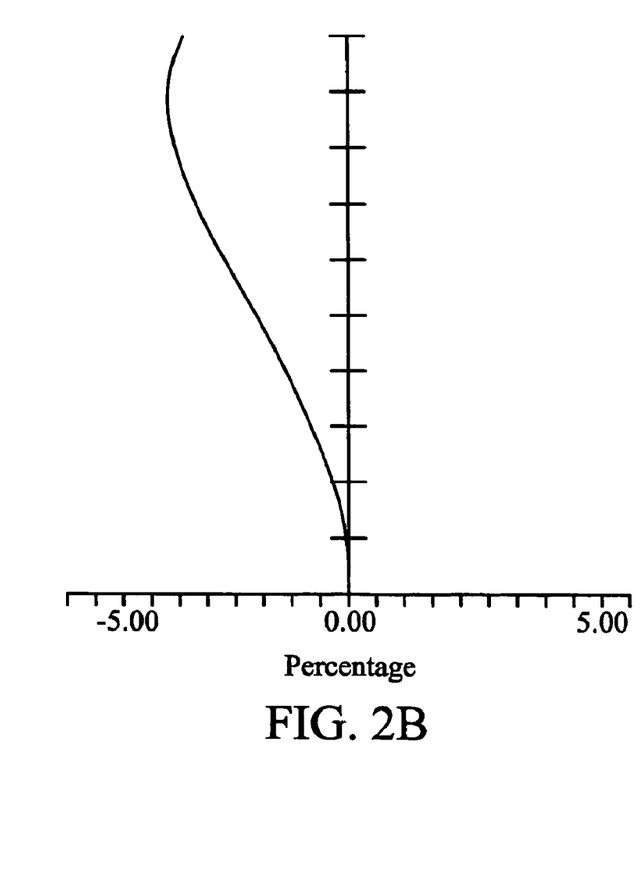
FIG. 2B is Distortion diagrams of the fixed focal length lens system of the first embodiment of the invention.
Figure 3A:
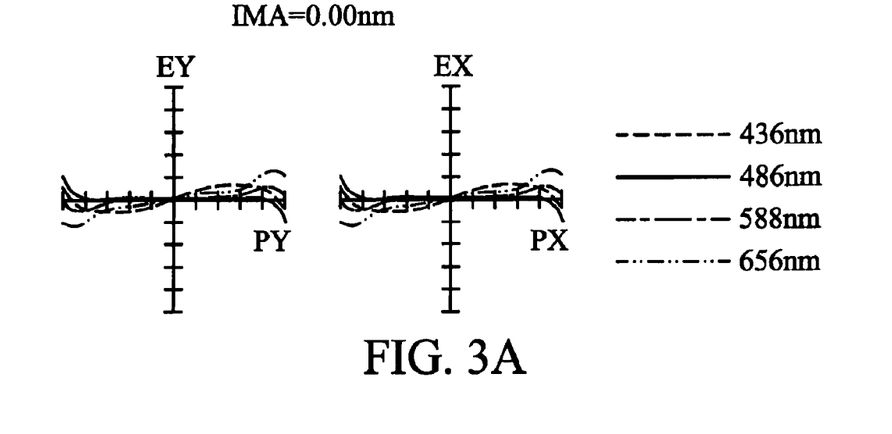
FIGS. 3A to 3F are ray fan diagrams of the first embodiment of the invention.
Figure 3B:
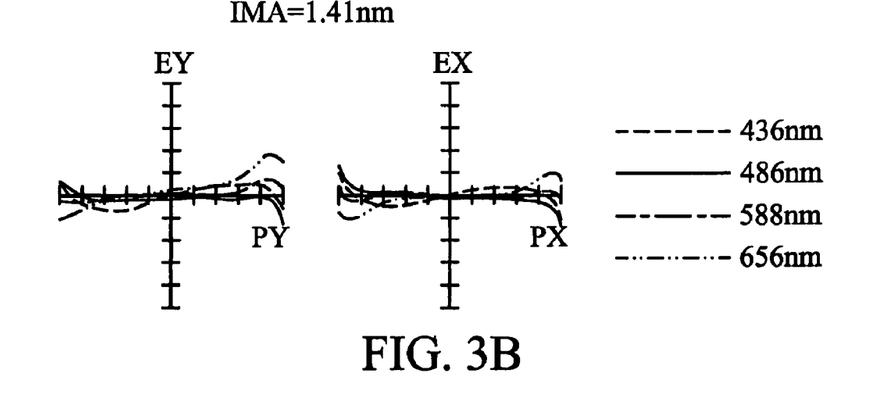
Figure 3C:
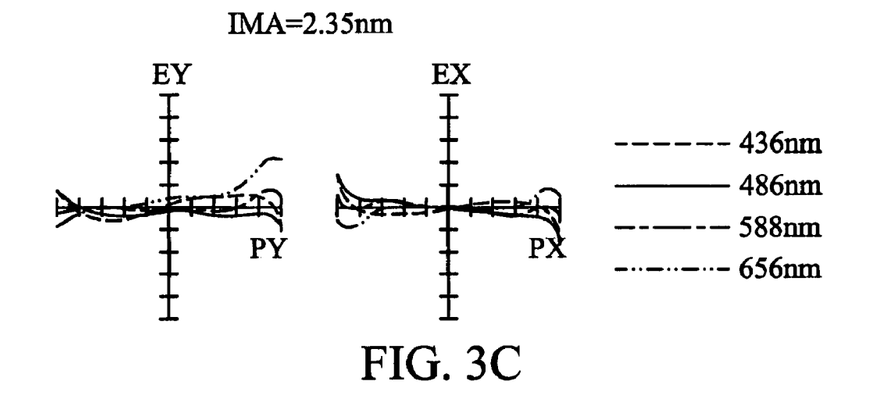
Figure 3D:
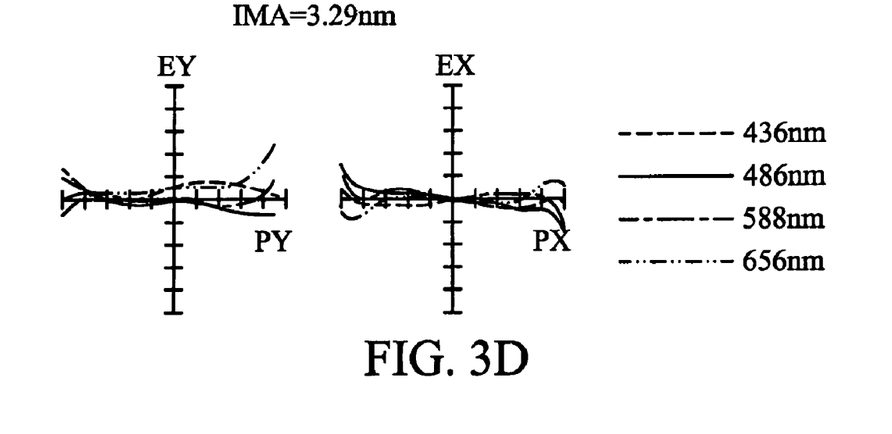
Figure 3E:
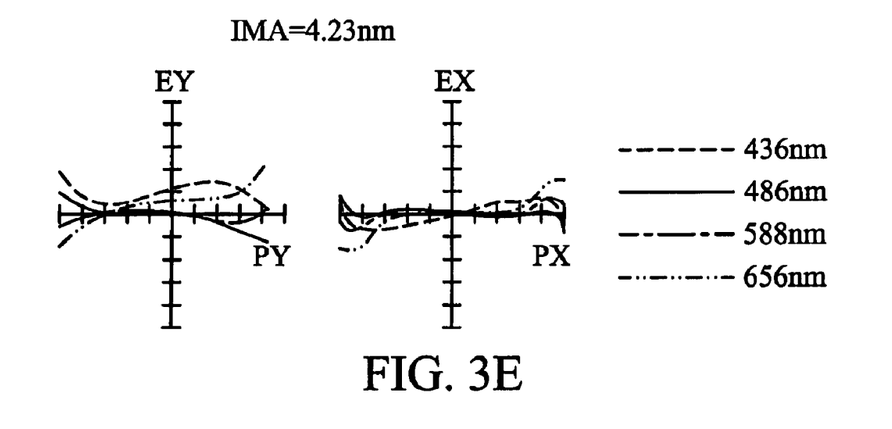
Figure 3F:
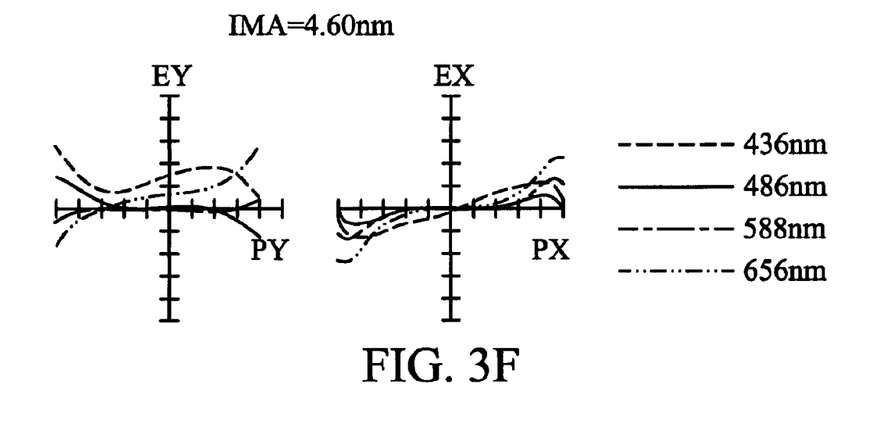

FIGS. 2A and 2B are Field Curvature/Distortion diagrams of the fixed focal length lens system of the first embodiment. The wavelength of incidence beam in FIGS. 2A and 2B is 486 nm. FIG. 2A is a Field Curvature diagram, wherein T is a tangential ray, S is a sagittal ray, the x-coordinate is a distance between the imaging point and ideal image surface, and the y-coordinate is an ideal image height or an incidence angle. FIG. 2B is a Distortion diagram, wherein the x-coordinate is inaccuracy percentage between the imaging point and ideal image surface, and the y-coordinate is ideal image height or incidence angle. As shown in FIGS. 2A and 2B, Field Curvature and Distortion of the fixed focal length lens system of the first embodiment are reduced.

FIGS. 3A to 3F are ray fan diagrams of conditions when the incident beam wavelengths are 436, 486, 588 and 656 nm. In FIGS. 3A to 3F, image heights are 0, 1.41, 2.35, 3.29, 4.23 and 4.6 nm. Each image height corresponds to two ray fan diagrams, one corresponding to a tangential surface (PY and EY), and the other corresponding to a sagittal surface (PX and EX). As shown in the ray fan diagrams, image inaccuracy of the fixed focal length lens system of the first embodiment is decreased.

Figure 4:
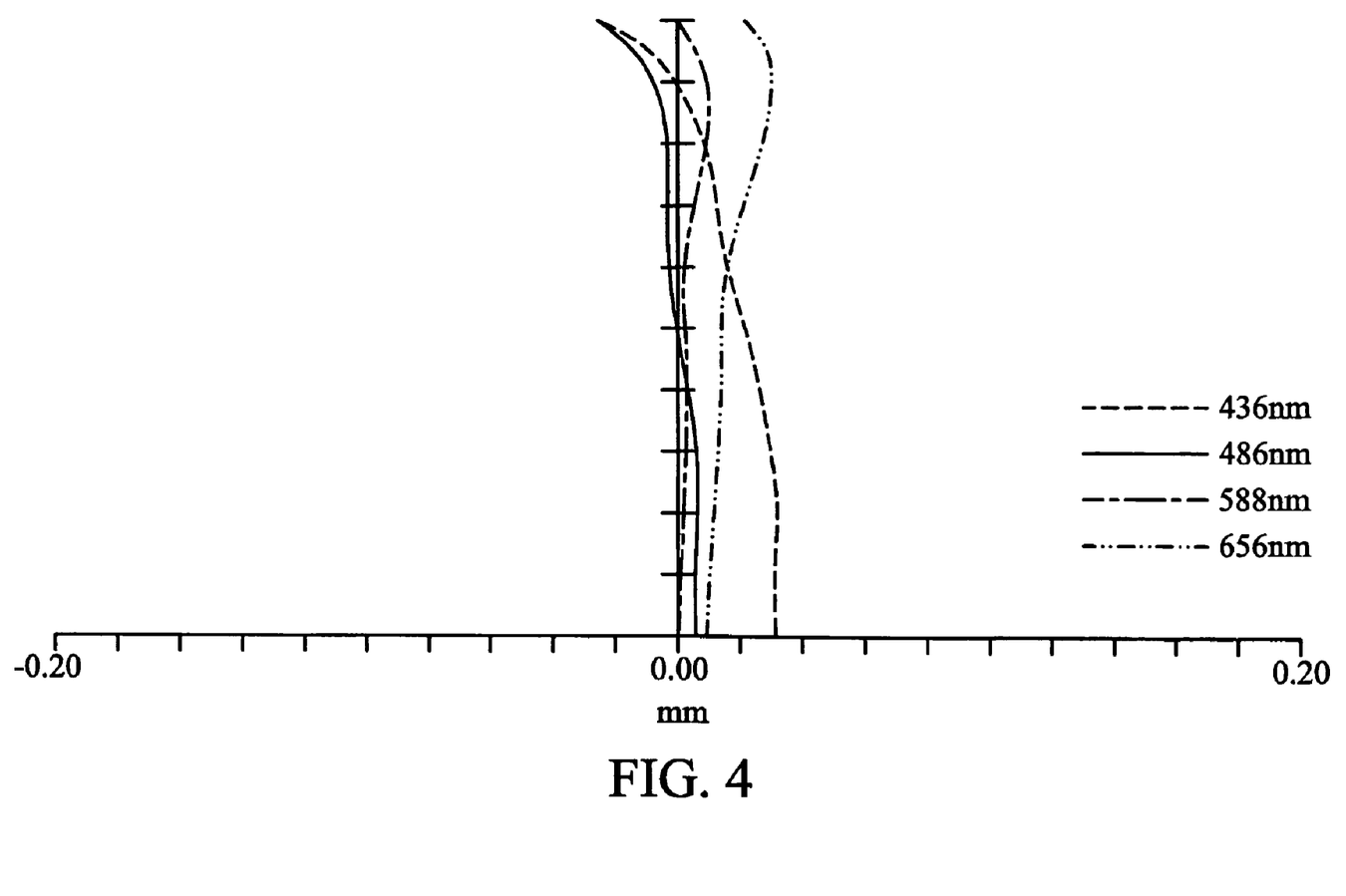
FIG. 4 shows vertical aberration of the first embodiment of the invention.

FIG. 4 shows vertical aberration of the first embodiment. In FIG. 4, when incident beam wavelengths are 436, 486, 588 and 656 nm, the fixed focal length lens system of the first embodiment provide an improved image.

Figure 5:
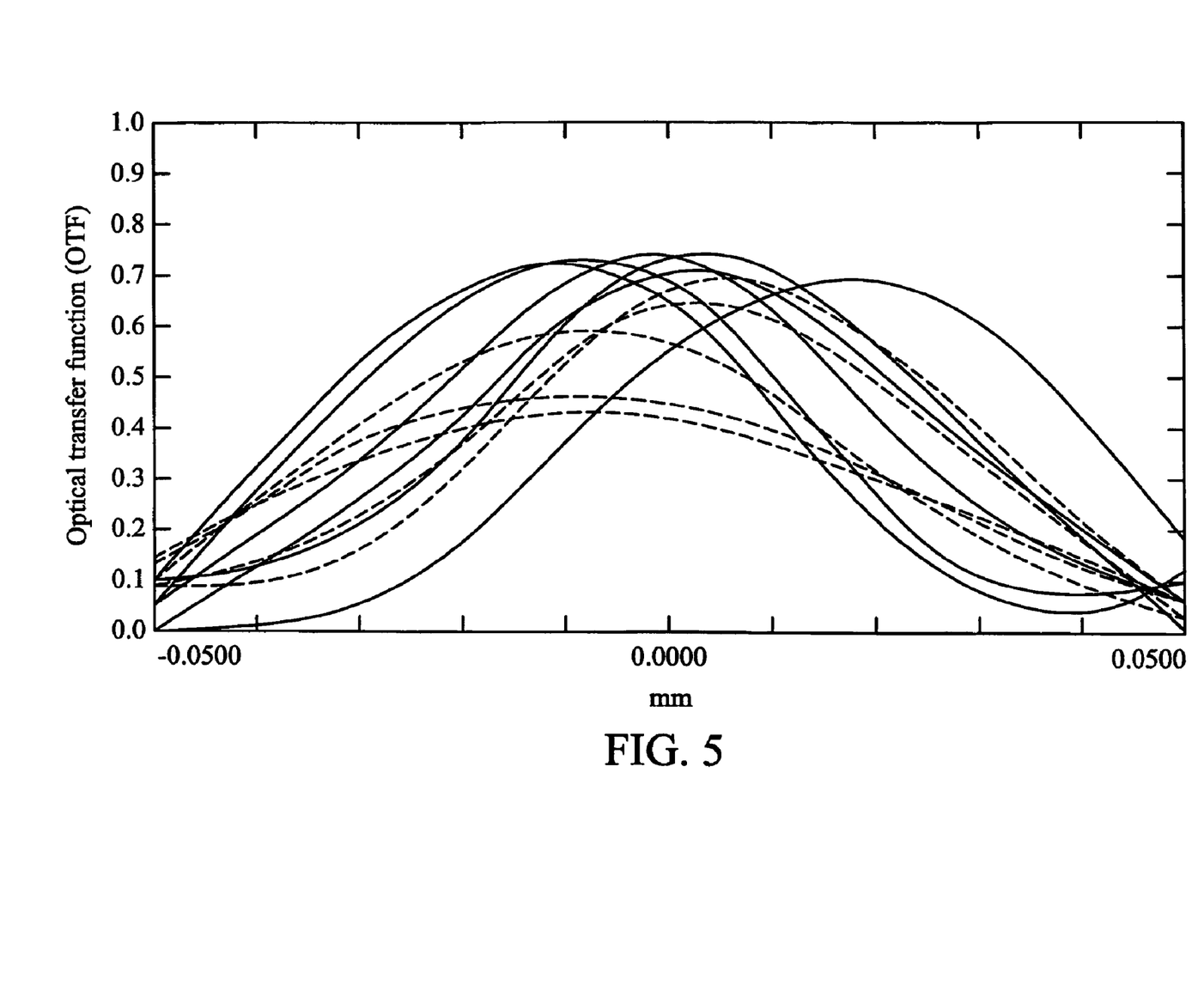
FIG. 5 is a through focus MTF diagram of the fixed focal length lens system of the first embodiment of the invention.

FIG. 5 is through focus MTF diagram of the fixed focal length lens system of the first embodiment, wherein spatial frequency equals 100 lp/mm. FIG. 5 shows focal point displacement and corresponding optical transfer function, which reveals improved optical resolution provided by the fixed focal length lens system of the first embodiment.

The invention shares tolerance sensitivity between lenses, and utilizes plastic non-spherical lenses to decrease cost. With the optical parameters mentioned above, the fixed focal length lens system of the invention provides improved image quality. Additionally, the length of the fixed focal length lens system of the first embodiment is decreased to 20.786 mm.

Table 4 shows parameters of the first lens unit and the second lens unit of the fixed focal length lens system of the second embodiment, wherein S11' and S12' are object surface and image surface of the second negative lens, S21' and S22' are object surface and image surface of the third positive lens, S31' and S32' are object surface and image surface of the fourth positive lens, S41' and S42' are object surface and image surface of the fifth positive lens, S51' and S52' are object surface and image surface of the sixth negative lens, STO is aperture raster 130, and FS1 and FS2 are two surfaces of the filter 140.

TABLE 6

| Surface number | A | B | C | D |
|---|---|---|---|---|
| S11' | $-1.50016 \times 10^{-4}$ | $3.56546 \times 10^{-6}$ | $-7.024125 \times 10^{-7}$ | $-1.86926 \times 10^{-9}$ |
| S12' | $1.19920 \times 10^{-3}$ | $1.45402 \times 10^{-4}$ | $-4.50250 \times 10^{-6}$ | $1.85992 \times 10^{-6}$ |
| S31' | $5.68833 \times 10^{-4}$ | $2.60156 \times 10^{-4}$ | $2.34204 \times 10^{-5}$ | $4.20542 \times 10^{-6}$ |
| S32' | $-6.94374 \times 10^{-3}$ | $1.96563 \times 10^{-4}$ | $-2.53741 \times 10^{-5}$ | $2.22257 \times 10^{-6}$ |

TABLE 4

| Assign number | Curvature radius (mm) | Thickness (mm) | Refractive index (Nd) | Abbe number (Vd) | Conic coefficient |
|---|---|---|---|---|---|
| S11' | 109 | 0.8 | 1.514648 | 56.963513 | −162.1372 |
| S12' | 3.68 | 1.6 | | | −0.2059319 |
| S21' | 30.6 | 1.6 | 1.58913 | 61.3 | |
| S22' | −15.5 | 2.6 | | | |
| STO. | INF. | 0.8 | | | |
| S31' | 28 | 1.8 | 1.514648 | 56.963513 | 60.87392 |
| S32' | −6.38 | 0.2 | | | −20.14728 |
| S41' | 5.58 | 1.6 | 1.6968 | 55.5 | |
| S42' | −11.03 | 0.2 | | | |
| S51' | 16.6 | 0.8 | 1.84666 | 23.8 | |
| S52' | 3.278 | 3 | | | |
| FS1 | INF. | 1 | 1.5168 | 64.2 | |
| FS2 | INF. | 2.47 | | | |

Other optical characteristics of the fixed focal length lens system of the second embodiment are shown on Table 5.

TABLE 5

| Item | Number |
|---|---|
| 2Gf/1Gf | −0.39918 |
| C1f/L3f | −0.4194 |
| L5f/L6f | −1.1169 |
| System length | 18.47 mm |
| F number | 2.857 |
| Focal length | 6 mm |
| Highest image height | 3.7 mm |

With reference to Table 5, the ratio 2Gf/1Gf of the fixed focal length lens system of the second embodiment is −0.39918, satisfying formula (1). The ratio (C1f)/L3f is −0.4194, satisfying formula (2). The ratio L5f/L6f is −1.1169, satisfying formula (3).

The second negative lens of the first lens unit and the fifth positive lens of the second lens unit are non-spherical lens, which satisfy the following formula:

$$z = \frac{ch^2}{1 + [1 - (k+1)c^2h^2]^{1/2}} + Ah^4 + Bh^6 + Ch^8 + Dh^{10},$$

wherein z is the sag number of the lens which represents depression of the lens surface, c is the inverse of the curvature radius, h is the distance between the lens surface and the optical axis, and k is Conic coefficient. A, B, C and D are high order non-spherical coefficients. The high order non-spherical coefficients of the non-spherical surfaces are shown in Table 6.

Figure 7A:
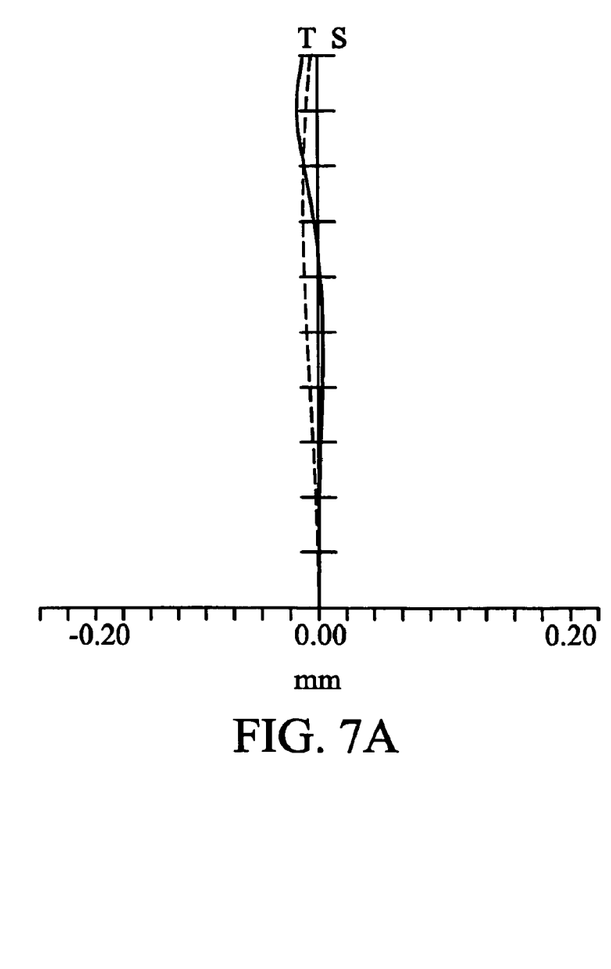
FIG. 7A is Field Curvature diagram of the fixed focal length lens system of the second embodiment of the invention.
Figure 7B:
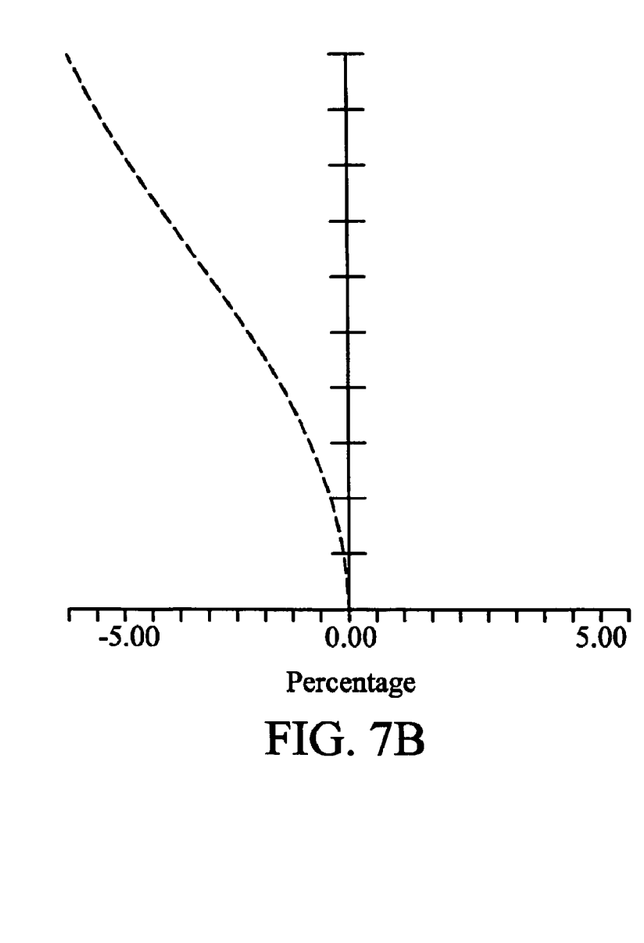
FIG. 7B is Distortion diagrams of the fixed focal length lens system of the second embodiment of the invention.
Figure 8A:
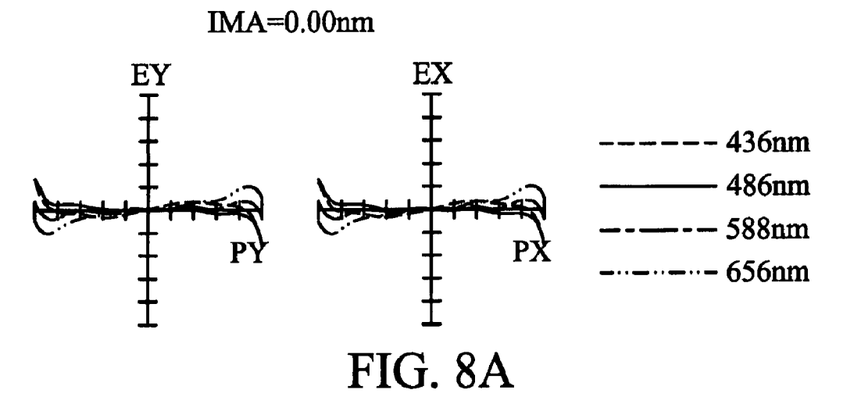
FIGS. 8A to 8F are ray fan diagrams of the second embodiment of the invention.
Figure 8B:
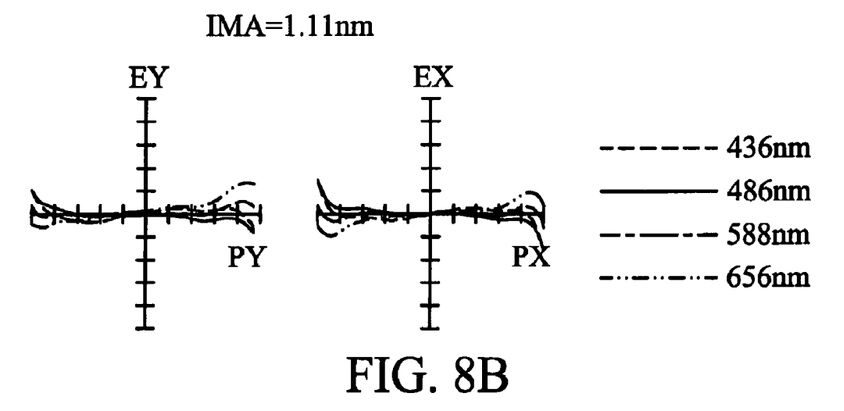
Figure 8C:
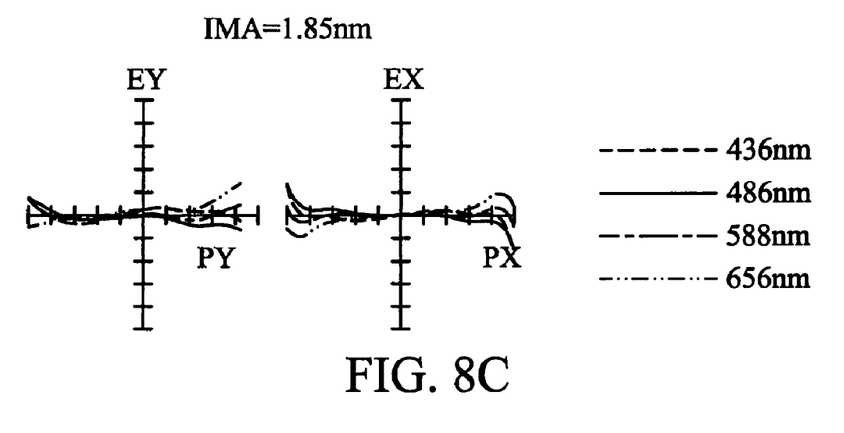
Figure 8D:
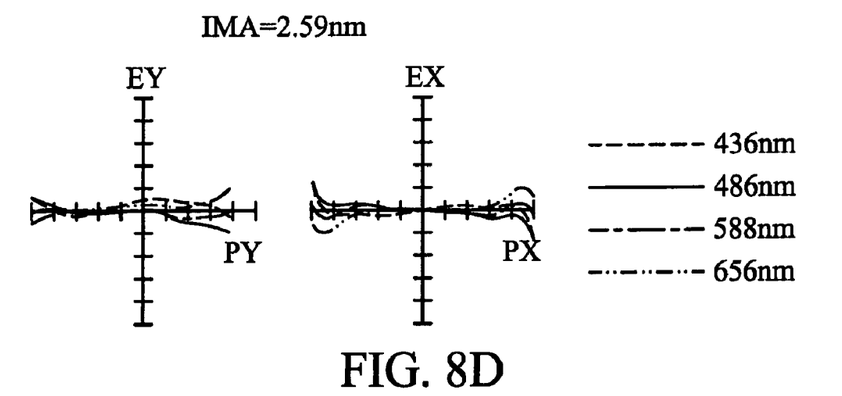
Figure 8E:
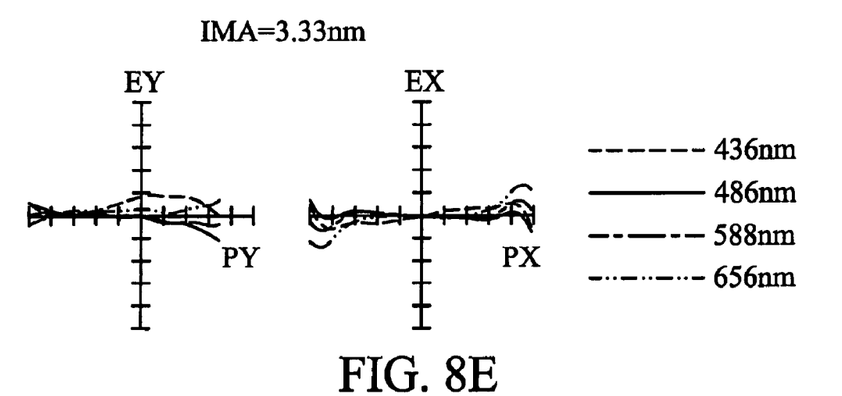
Figure 8F:
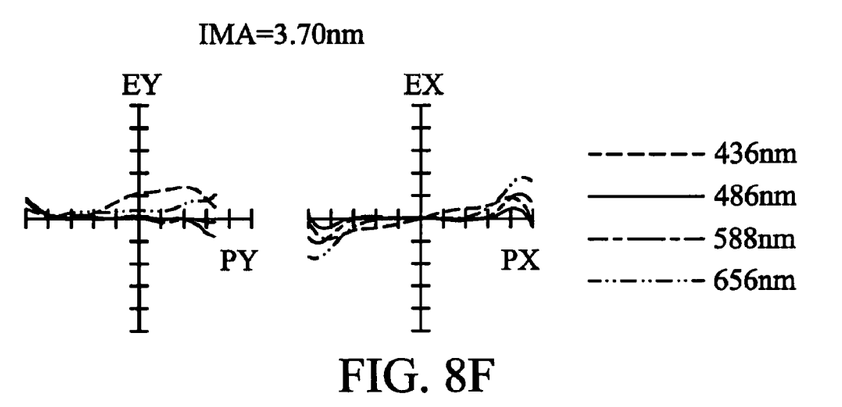

FIGS. 7A and 7B are Field Curvature/Distortion diagrams of the fixed focal length lens system of the second embodiment. The wavelength of the incidence beam in FIGS. 7A and 7B is 486 nm. FIG. 7A is Field Curvature diagram, wherein T is a tangential ray, S is a sagittal ray, the x-coordinate is a distance between the imaging point and an ideal image surface, and the y-coordinate is an ideal image height or an incidence angle. FIG. 7B is a Distortion diagram, wherein the x-coordinate is an inaccuracy percentage between the imaging point and the ideal image surface, and the y-coordinate is an ideal image height or an incidence angle. As shown in FIGS. 7A and 7B, the Field Curvature and Distortion of the fixed focal length lens system of the second embodiment are reduced.

FIGS. 8A to 8F are ray fan diagrams of conditions when the incident beam wavelengths are 436, 486, 588 and 656 nm. In FIGS. 8A to 8F, the image heights are 0, 1.11, 1.85, 2.59, 3.33 and 3.7 nm. Each image height corresponds to two ray fan diagram, wherein one corresponds to the tangential surface (PY and EY), and the other corresponds to the sagittal surface (PX and EX). As shown in the ray fan diagrams, image inaccuracy of the fixed focal length lens system of the second embodiment is decreased.

Figure 9:
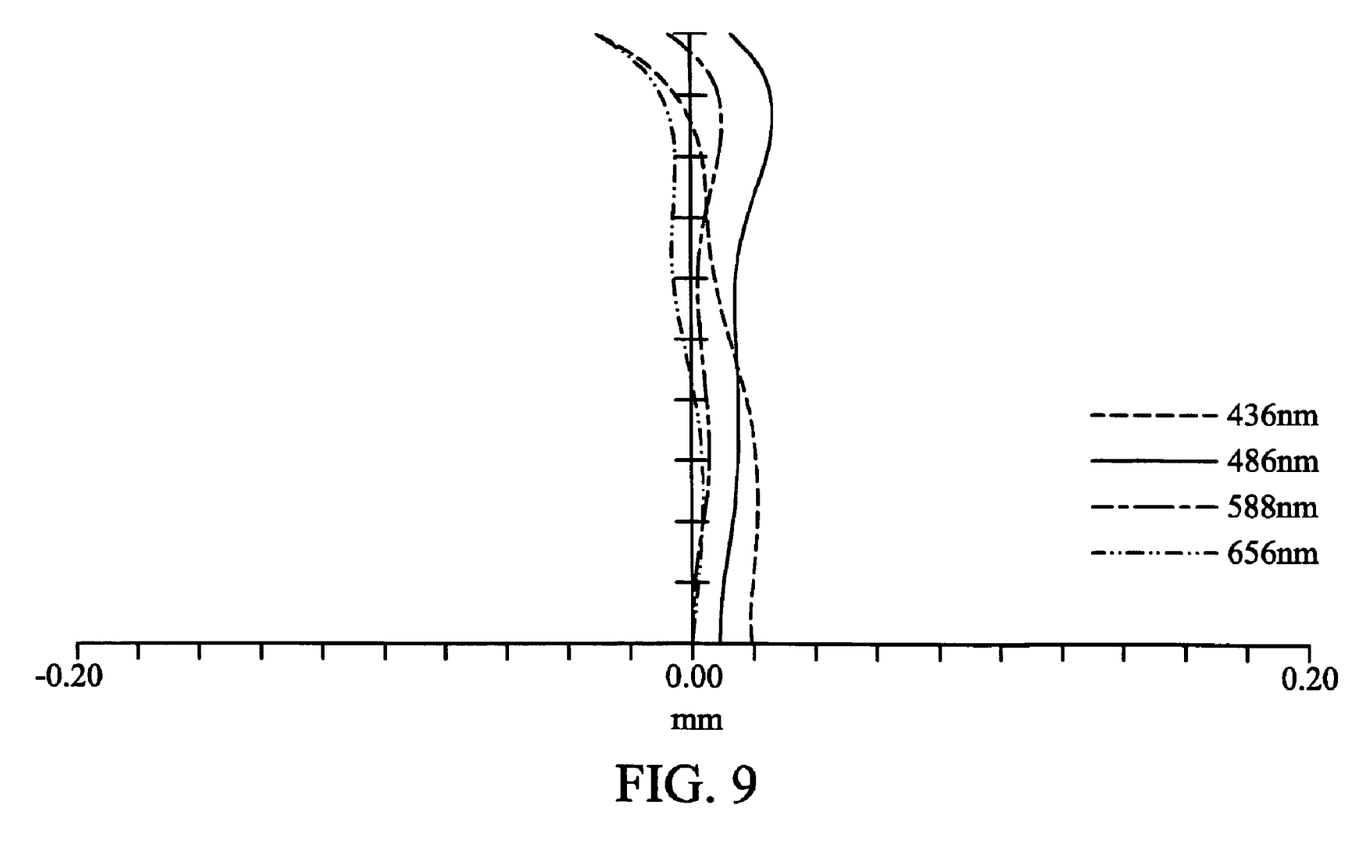
FIG. 9 shows vertical aberration of the second embodiment of the invention.

FIG. 9 shows vertical aberration of the second embodiment. In FIG. 9, when incident beam wavelengths are 436, 486, 588 and 656 nm, the fixed focal length lens system of the second embodiment provides improved image.

Figure 10A:
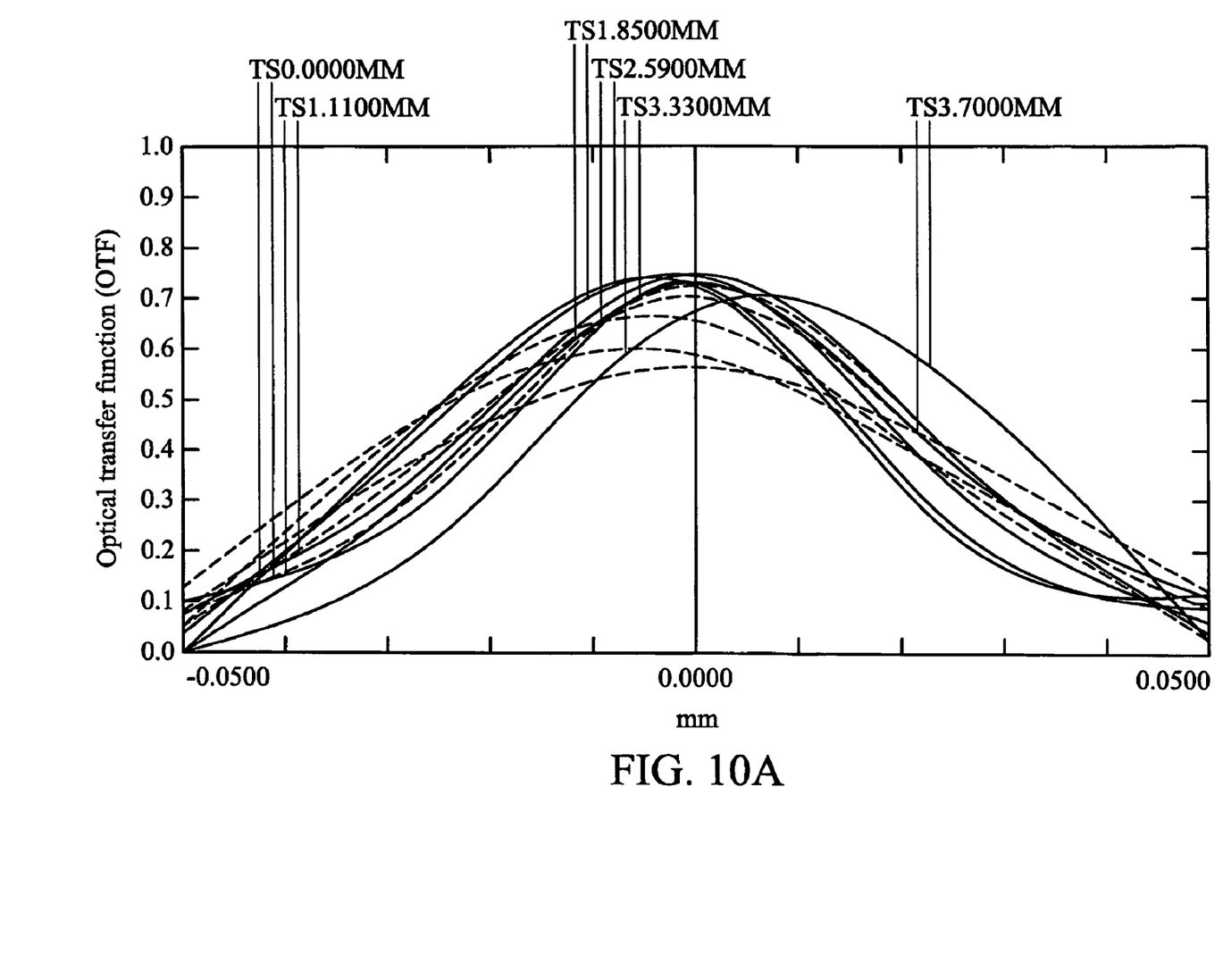
FIGS. 10A and 10B are through focus MTF diagrams of the fixed focal length lens system of the second embodiment of the invention.
Figure 10B:
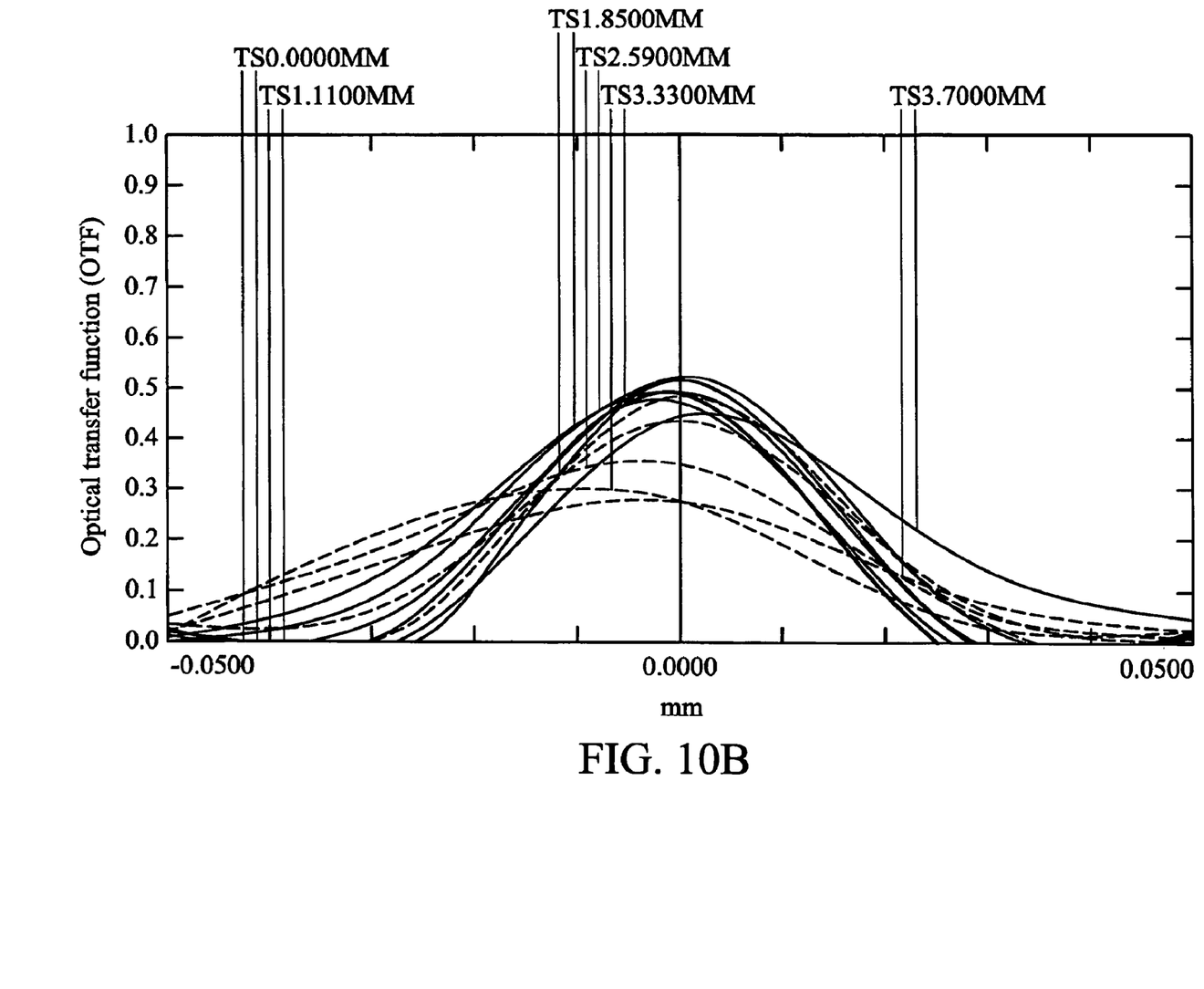

FIGS. 10A and 10B are through focus MTF diagrams of the fixed focal length lens system of the second embodiment, wherein, in FIG. 10A, spatial frequency equals 100 lp/mm. In FIG. 10B, spatial frequency equals 200 lp/mm. FIGS. 10A and 10B show focal point displacement and corresponding optical transfer function, which reveals improved optical resolution provided by the fixed focal length lens system of the second embodiment.

The invention shares tolerance sensitivity between lenses, and utilizes plastic non-spherical lenses to decrease cost. With the optical parameters mentioned above, the fixed focal length lens system of the invention provides improved image quality. Additionally, the length of the fixed focal length lens system of the second embodiment is decreased to 18.47 mm.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fixed focal length lens system, comprising:
   a first lens unit, comprising a plastic negative lens, an object positive lens and an end positive lens, wherein the object positive lens and the end positive lens are located on two sides of the plastic negative lens, the first lens unit has a negative diopter, and the plastic negative lens comprises at least one non-spherical surface; and a second lens unit, comprising a plastic positive lens, wherein the second lens unit has a positive diopter, and the plastic positive lens comprises at least one non-spherical surface;

wherein the first lens unit and the second lens unit are aligned from an object side to an image side on an optical axis and the fixed focal length lens system satisfies the equation:

$-1 < 2Gf/1Gf < 0$ wherein 1Gf is the focal length of the first lens unit, and 2Gf is the focal length of the second lens unit, wherein the first lens unit satisfies the equation:

$-0.5 < (C1f/L3f) < 0.5$ wherein C1f is a combination of the focal length of the object positive lens and the plastic negative lens, and L3f is the focal length of the end positive lens.

2. The fixed focal length lens system as claimed in claim 1, wherein the second lens unit comprises a central positive lens and an image negative lens, and the central positive lens is located between the plastic positive lens and the image negative lens.

3. The fixed focal length lens system as claimed in claim 2, wherein the second lens unit satisfies the equation:

$-1.5 < (L5f/L6f) < -0.5$ wherein L5f is the focal length of the central positive lens, and L6f is the focal length of the image negative lens.

4. The fixed focal length lens system as claimed in claim 1, further comprising an aperture raster located between the first and second lens units.

5. The fixed focal length lens system as claimed in claim 1, further comprising a filter located between the second lens unit and the image side.

6. A fixed focal length lens system, comprising:

a first lens unit, comprising a plastic negative lens, an object positive lens and an end positive lens, wherein the object positive lens and the end positive lens are located on two sides of the plastic negative lens, the first lens unit has a negative diopter, and the plastic negative lens comprises at least one non-spherical surface; and a second lens unit, comprising a plastic positive lens, wherein the second lens unit has a positive diopter, and the plastic positive lens comprises at least one non-spherical surface;

wherein the first lens unit and the second lens unit are aligned from an object side to an image side on an optical axis and the fixed focal length lens system satisfies the equation:

$-1 < 2Gf/1Gf < 0$ wherein 1Gf is the focal length of the first lens unit, and 2Gf is the focal length of the second lens unit, wherein the first lens unit satisfies the equation:

$-0.5 < (C1f/L3f) < 0.5$ wherein, C1f comprises a focal length of the plastic negative lens without a focal length of the end positive lens, and L3f is the focal length of the end positive lens.

* * * * *